April 27, 1943.  F. S. STOUT ET AL  2,317,493
IRONING MACHINE
Filed July 24, 1941  5 Sheets-Sheet 1

April 27, 1943.　　F. S. STOUT ET AL　　2,317,493
IRONING MACHINE
Filed July 24, 1941　　5 Sheets-Sheet 2

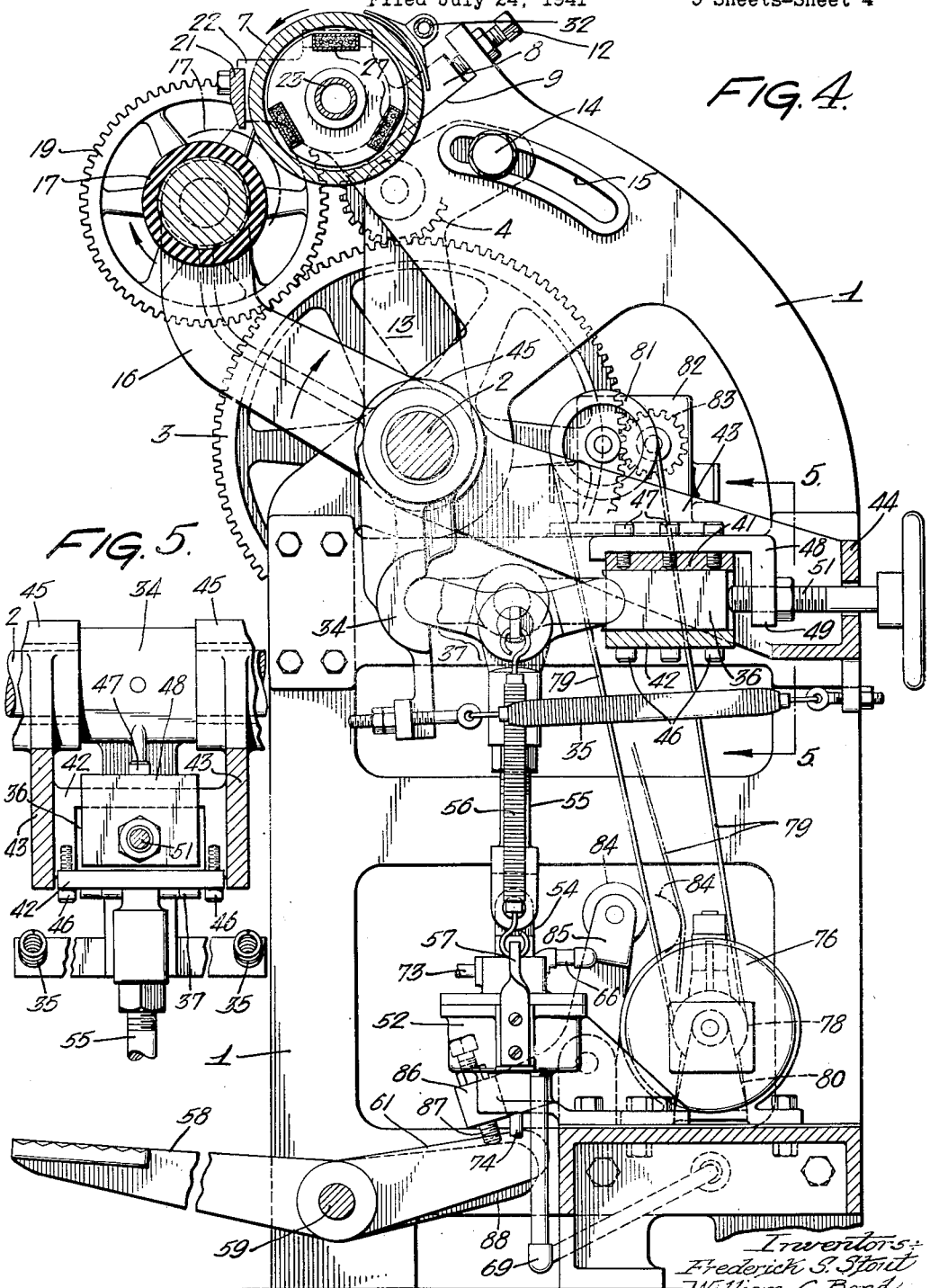

Patented Apr. 27, 1943

2,317,493

UNITED STATES PATENT OFFICE 2,317,493

IRONING MACHINE

Frederick S. Stout, Cynwyd, Pa., William G. Bond, Holly Oak, Del., and Lawrence A. Ladner, Camden, N. J., assignors to F. F. Slocomb Corporation, Wilmington, Del., a corporation of Delaware Application July 24, 1941, Serial No. 403,922

9 Claims. (Cl. 149—23)

A principal object of this invention is to provide an ironing machine, primarily for leather and the like, of generally improved design and operating characteristics; and the invention resides in the construction and combinations of elements, hereinafter described and illustrated in the attached drawings, which contribute mutually to the aforesaid primary end.

Other more specific objects of the invention will appear hereinafter.

In the attached drawings:

Fig. 4 is a section on the line 4—4, Fig. 1;

Fig. 5 is a section on the line 5—5, Fig. 4;

Fig. 6 is a fragmentary view in perspective showing a detail of the actuating mechanism;

Figure 3:
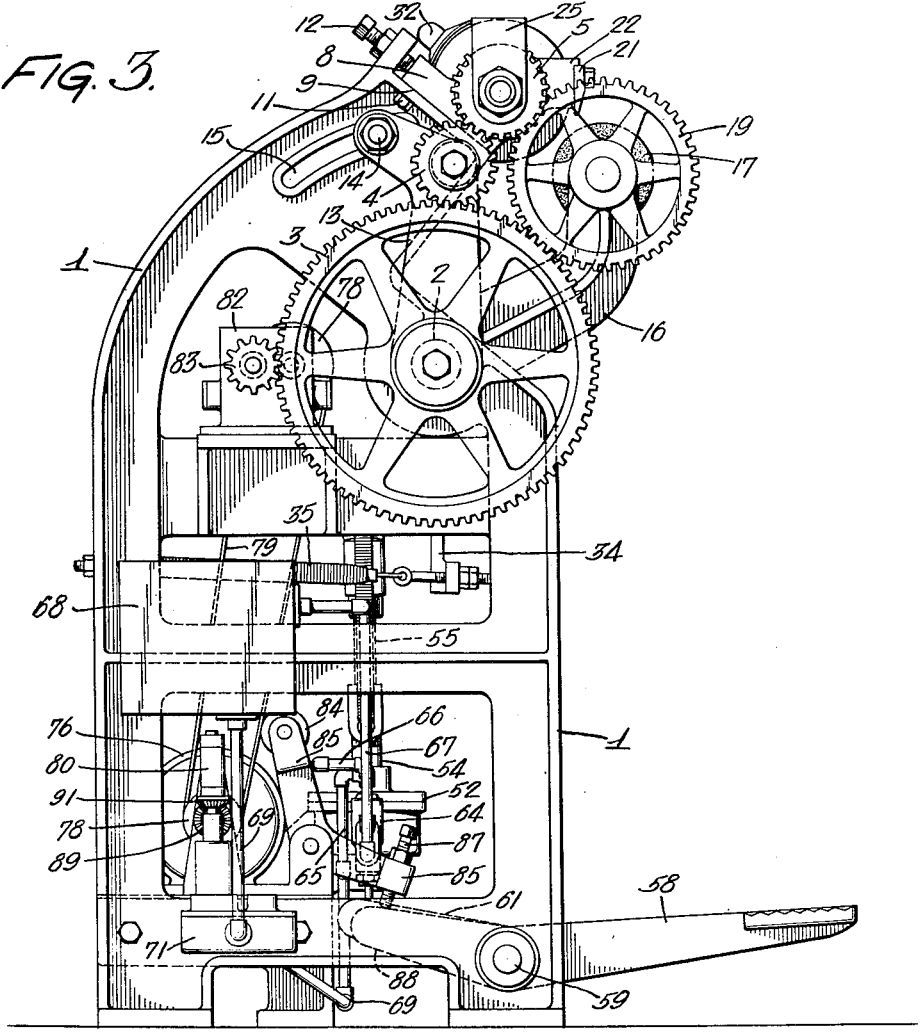
Fig. 3 is an end elevational view of the machine.

With reference to the drawings, the machine comprises a suitable frame 1, in which is journaled a rock shaft 2. Loosely mounted on one end of the shaft 2 is a gear 3 which is connected, through a pinion 4, with a gear 5 attached to one of the trunnions 6 of a heated ironing roll 7, this roll, as best shown in Figs. 3 and 4, being journaled in brackets 8; 8 adjustably supported on inclined guides 9 at the top of the frame. The brackets 8 are solidly clamped to the guides by means of screws 11 and are backed at the top by adjustable screws 12 as illustrated. The pinion 4 is journaled on an arm 13 pivotally supported on the shaft 2, the outer end of the arm 13 having therein a bolt 14 which passes through an arcuate slot 15 in the frame. The slot 15 is concentric with the axis of the shaft 2 and provides for adjustment of the arm 13 around the shaft to carry the pinion 4 into proper mating relation with the gears 3 and 5 irrespective of the position to which the brackets 8 may be adjusted.

Secured to the shaft 2 at opposite sides of the frame respectively are arms 16, 16, in the outer ends of which is journaled a press roll 17, preferably rubber-covered. The trunnion 18 at one end of the roll 17 has secured thereto a gear 19, which meshes with the gear 3 as illustrated. Rocking movement of the shaft 2 does not disturb the normal meshing relation between the gear 19 and the gear 3. By rocking the shaft 2, the press roll 17 will be brought into engagement with the ironing roll 7, as illustrated in broken lines in Fig. 4. In a retracted position, as shown in full lines in Fig. 4, the roll 17 is removed from the ironing roll 7 to an extent providing for admission between the rolls of the leather or other product under treatment. The bite between the rolls is guarded by a relatively fixed bar 21 which extends over the full length of the rolls and which is mounted in the present instance upon forwardly projecting arms 22 of the brackets 8.

The trunnions 6 of the ironing roll 7 are hollow to permit the installation in the latter of a tube 23. This tube is supported at opposite ends upon brackets 24 and 25 which are secured to the brackets 8 and which retain the tube 23 in relatively fixed position within the roll 7 and its trunnions. Within the roll 7, the tube 23 provides a support for a number of spiders 26, and these spiders provide in turn a support for a plurality of elongated electrical heating elements 27 which extend over the full length of the roll and in close proximity to the cylindrical wall of the latter. These heating elements are connected to a suitable source of electric energy by means of wires 28 which extend from one end through the tube 23 to the center of the latter and through ports 29 at the center of the tube to the said heating elements. These wires are carried to the end of the tube 23 in the present instance through a duct 31. The electrical circuit also comprises a thermostatically controlled switch or other suitable regualting device, the thermosensitive element, 32, of which is mounted in proximity to the surface of the roll 7, and which in conjunction with a manually adjustable control 33 functions to maintain the roll 7 at a predetermined desirable temperature. Control devices of this character are available in the trade, and the device itself forms no part of the present invention.

Figure 1:
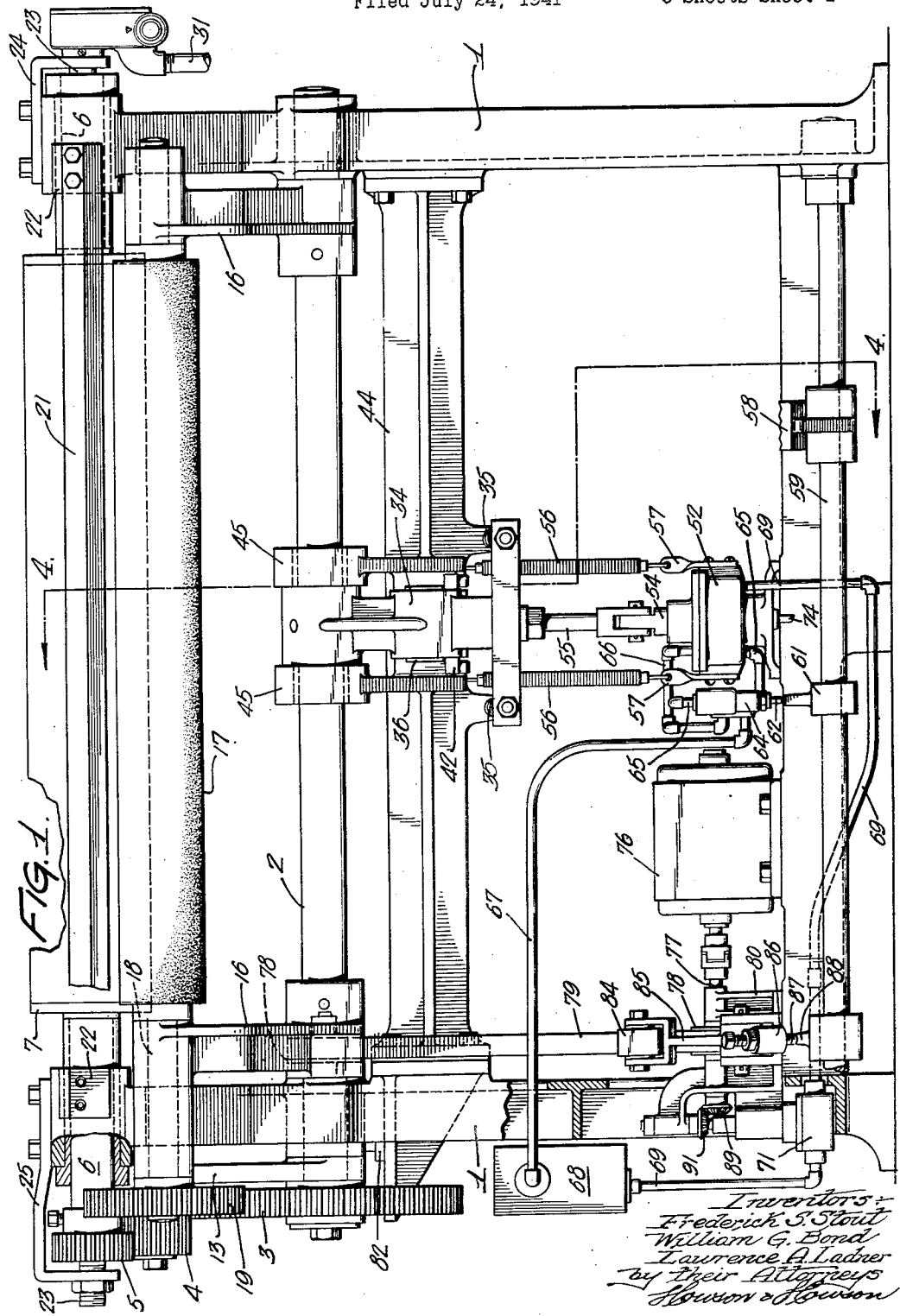
Figure 1 is a front elevational view of a machine made in accordance with the invention.
Figure 2:
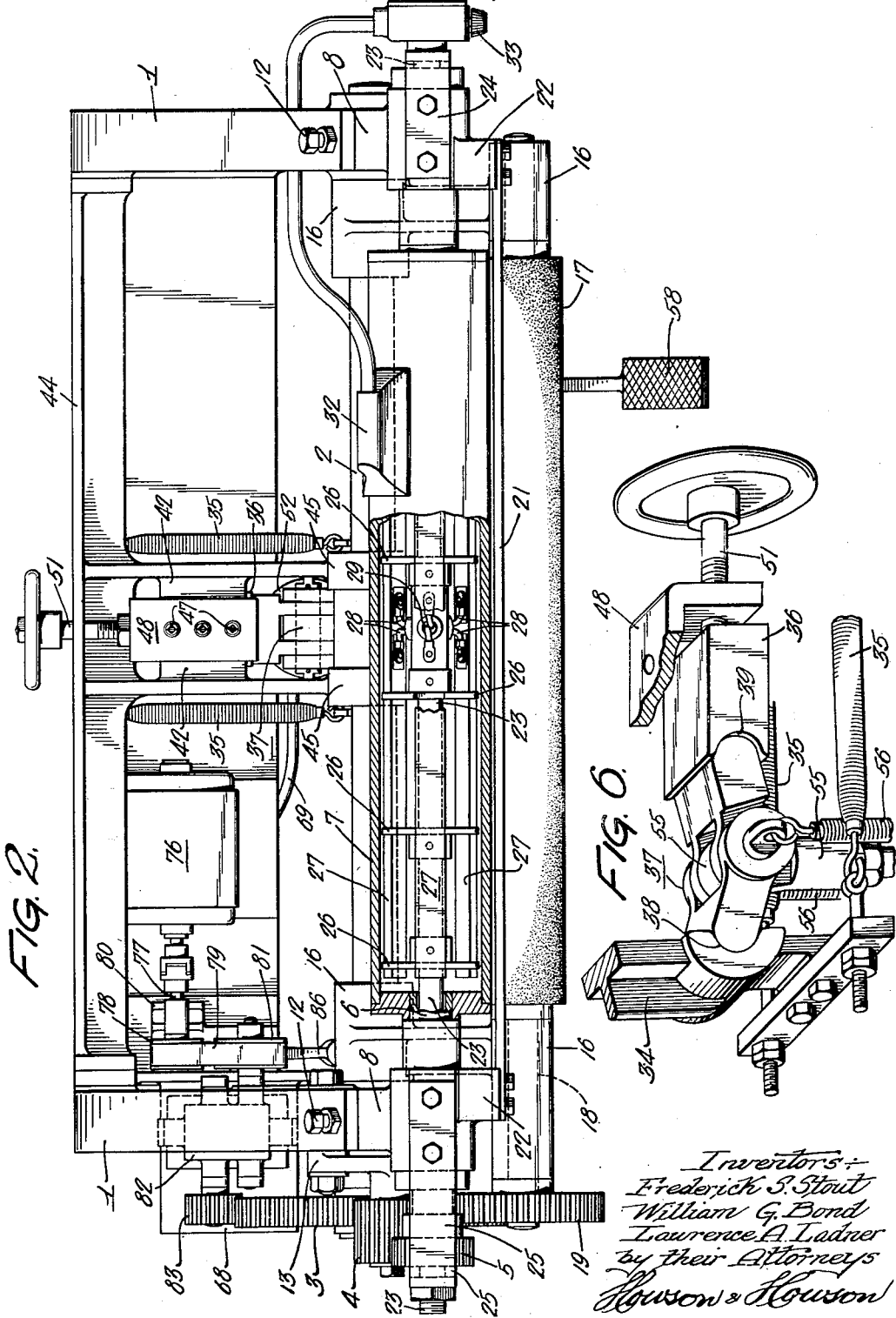
Fig. 2 is a plan view of the machine.

The shaft 2 is oscillated to advance and retract the press or feed roll 7 by means, in the present instance, of a toggle device illustrated in detail in Fig. 6, and shown also in Figs. 1, 4 and 6. As best shown in Fig. 4, the shaft 2 has secured thereto at a position centrally between the arms 16, 16 a depending arm 34. To the lower end of this arm is adjustably attached springs 35, 35 which tend normally to retain the shaft 2 in a position in which the roll 17 is retracted from the roll 7 as illustrated. Supported between the arm 34 and an adjustable block 36 slidably supported in the frame 1 is a toggle 37, the oppositely extending arms of this toggle being fitted respectively into a socket 38 on the arm 34 and a socket 39 at the proximate side of the block 36.

As shown in Fig. 4, the block 36 is slidably supported between guides 41 and 42, the guide 42 being integral with and extending transversely between two arms 43, 43 which are connected at one end to a cross member 44 on the frame 1, and at their opposite ends are provided with bosses 45 which embrace the shaft 2. The guide 42 is in the form of a separate plate which is secured by screws 46 to the under side of the arms 43. Secured to the top of the guide 42 by means of screws 47 is a cap plate 48 which has a depending flange 49 into which is threaded a screw 51 which engages the outer end of the block 36 and anchors the block in a desired position of adjustment between the guides 41 and 42. The block 36 constitutes a fixed abutment for one arm of the toggle 37, and the adjusting screw 51 takes the thrust of the toggle exerted through the block. This thrust in turn is imposed through the cap plate 48 upon the upper guide 41 and through the arms 43, of which this guide forms a part, to the shaft 2, thereby imposing upon the shaft a portion of the thrust which otherwise would fall entirely upon a relatively small portion of the frame and helping in that manner to distribute the thrust over the frame.

The toggle is actuated in the present instance by fluid pressure applied in a cylinder 52, this cylinder containing a piston 53 having a rod 54 which extends through the top of the cylinder and which is connected with a rod 55 depending from the central joint of the toggle 37, as shown in Fig. 6. Normally the toggle takes the position shown in Figs. 4 and 6, wherein the piston 53 is at the bottom of the cylinder, the parts being urged to this relatively depressed position by springs 56, 56 which are attached to the opposite ends of the toggle 37, as shown in Fig. 6, and to relatively fixed anchor straps 57, 57 secured in the present instance to the sides of the cylinder 52. When the piston 53 is elevated, the toggle is forced into the position shown in broken lines in Fig. 4, thereby acting through the adjustable block 36 to force the arm 34 to the left, as viewed in the drawing, and rocking the shaft 2 in a clockwise direction, as indicated by the arrow. This movement of the shaft 2 through the arm 16 carries the roll 17 into forcible engagement with the heated roll 7. The pressure of the roll 17 against the roll 7 may be regulated in obvious manner by adjustment of the position of the block 36 through the medium of the screw 51, and also by adjustment of the roll 7 on the frame. It will be noted that with the aforedescribed construction, the roll 17 is forced with uniform pressure throughout its length against the roll 7, any torsion occurring in the shaft 2 being equally distributed between the substantially equal portions of the shaft at opposite sides of the lever 34, through which lever the turning moment is applied to the shaft. The work is thus subjected to uniform pressure over its entire area between the rolls 7 and 17.

Figure 7:
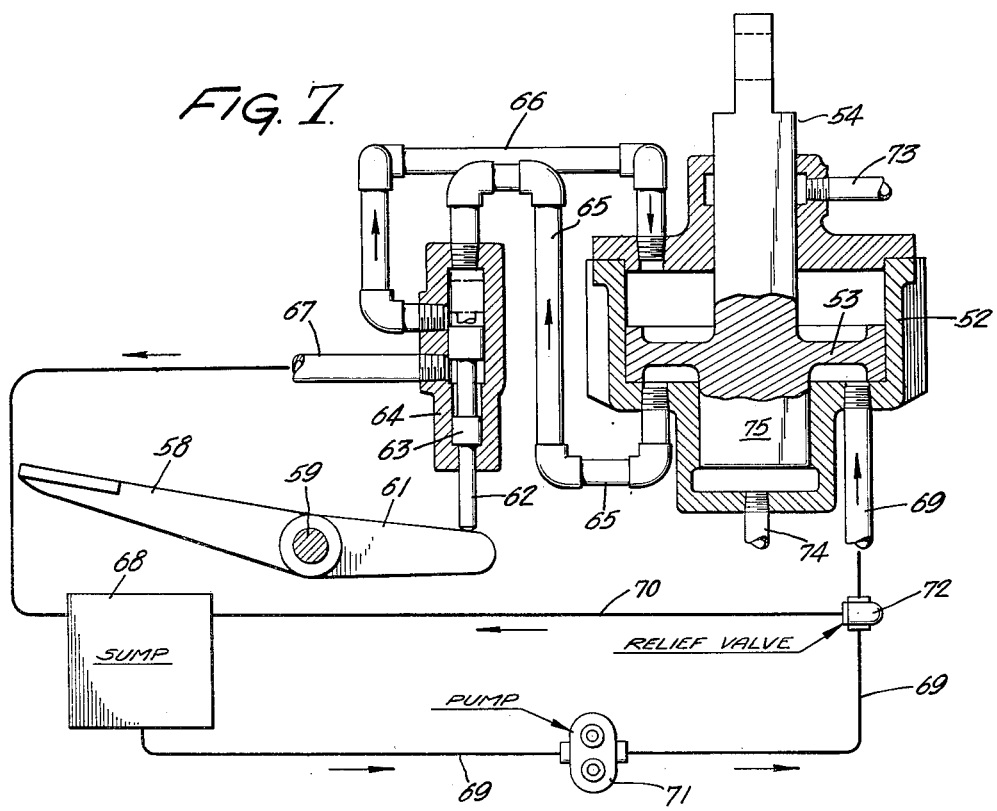
Fig. 7 is a diagrammatic view illustrating a fluid pressure system forming a part of the actuating mechanism.

Actuation of the toggle as described is effected in the present instance through the medium of a treadle lever 58 which is attached to a rock shaft 59 journaled in the bottom of the frame 1. This shaft has an arm 61 which engages the stem 62 of a valve 63 slidably mounted in a valve casing 64. As shown in Fig. 7, the casing 64 is connected, through a pipe 65, with the cylinder 52 at the under side of the piston 53, and the housing is similarly connected through a pipe 66 with the space within the cylinder 52 above the piston 53. The valve casing 64 is also connected through a pipe 67 with a sump 68. Fluid is withdrawn from the sump 68 through a duct 69 by a pump 71 and is forced by the pump through the duct 69 to the interior of the cylinder 52 below the piston 53. A bypass 70 is provided between the duct 69 and the sump, said bypass being controlled by a relief valve 72.

With the valve 63 in the position shown in Fig. 7, fluid withdrawn from the sump 68 by the pump 71 is forced by the latter into the bottom of the cylinder 52, and therefrom through the pipes 65 and 66 to the top of the cylinder, equal pressures being thereby imposed upon opposite sides of the piston. Since the area of the upper side of the piston is greater than that of the lower side of the piston, the latter will be held by fluid pressure at the bottom of the cylinder, wherein as previously set forth, the toggle 37 is in the broken or depressed position and the roll 17 is removed from the roll 7. When the valve 63 is elevated, by depression of the treadle 58, the pipe 66 will be connected with the exhaust pipe 67, and disconnected from the pipe 65 whereby the fluid pressure applied to the under side of the piston 53 through the duct 69 will operate to elevate the piston in the cylinder, thereby bringing the roll 17 into forcible engagement with the roll 7. Pipes 73 and 74 connected with the cylinder 52 function to drain any fluid passing the plunger 54 and the lower extension 75 of the piston 53 from the cylinder casing.

The gear 3 is actuated by a motor 76 mounted in the bottom of the frame 1. This motor is connected to a shaft 77 journaled in a bracket 80 on the frame 1, the shaft 77 carrying a pulley 78 which is connected through a belt 79 with a pulley 81 forming one terminal element of a reduction gear unit 82 mounted on the frame 1 in a position adjoining the gear 3. A pinion 83 constituting the other terminal element of the reduction gear unit 82 meshes with the gear 3. The belt 79 is normally loose upon the pulleys 78 and 81 so as to transmit no motion therebetween, but may be tightened on the pulleys by means of an idler 84 which is carried by one arm of a bell crank lever 85 pivotally supported in the frame. The other arm 86 of the lever 85 carries an adjusting screw 87 which engages an arm 88 on the shaft 59, so that when the arm 88 is elevated by depression of the treadle 58, the idler 84 will tighten the belt, as illustrated in broken lines in Fig. 4, thereby causing the belt to transmit motion from the pulley 78 to the pulley 81, and through the reduction unit 82 to drive the gear 3. This actuation of the gear 3 is synchronized with the actuation of the piston 53 to move the roll 17 into engagement with the roll 7, so that by reason of the operative connection between the said rolls and the gear 3, the said rolls will be rotated when in pressure engagement. The transmission gearing is such that the roll 7 is rotated at a faster rate than the roll 17, a ratio of two to one having been found suitable. As the work piece is fed between the rolls, therefore, and by reason of the increased friction between the work and the rubber-covered roll 17, the smooth-faced metal ironing roll 7 will slide over the surface of the work, thereby giving the desired ironing action. Rotation of the rolls is in the directions indicated by the arrows in Fig. 4.

If it be desired to use an embossing roll in place of the ironing roll 7, the gear 19 may be eliminated, the press roll 17 then becoming a free roll. It will be noted that the shaft 77 carries at one end a bevel gear 89 which meshes with a bevel gear 91 on the shaft of the pump 71 whereby the said pump is operatively connected with the motor 76.

Figure 8:
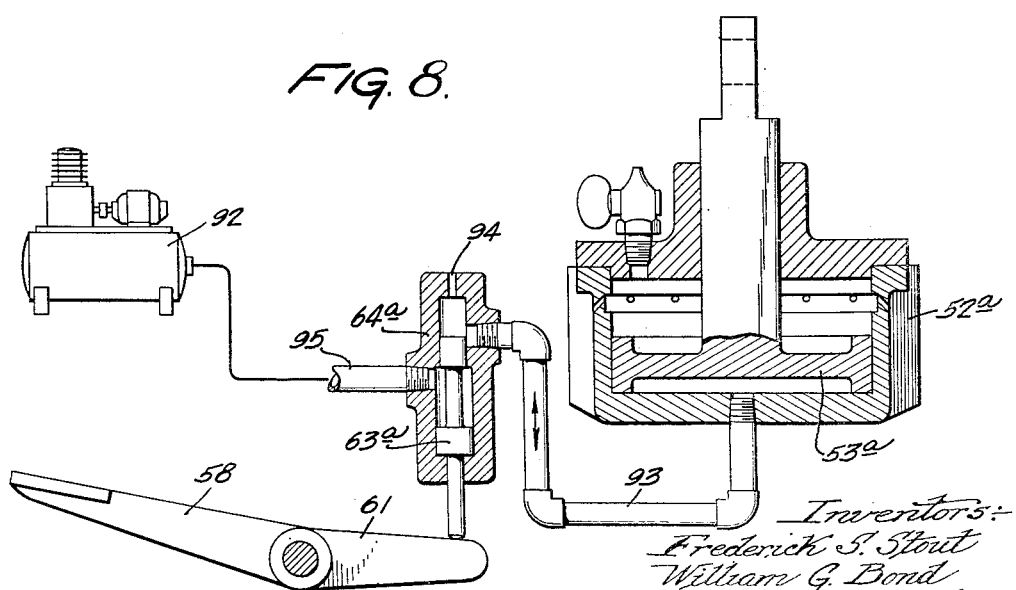
Fig. 8 is a corresponding view illustrating a modification within the scope of the invention.

A modification of the fluid system for actuating the toggle 37 is illustrated in Fig. 8. In this case, the cylinder 52a is connected through a control valve 64a with a source 92 of pressure air. When the valve element 63a is in the position shown in the drawings, the bottom area of the cylinder 52a below the piston 53a is connected through the pipe 93 with the exhaust port 94 of the valve casing so that the piston is permitted to assume the position shown. When the valve 63a is elevated, the pipe 93 is directly connected through a pipe 95 with the source of pressure air, said air being thus admitted to the under side of the piston 53a and forcing the latter upwardly in the cylinder to actuate the toggle as previously described.

The mode of operation of the machine will be apparent from the foregoing description. The operator after inserting one edge of the work between the separated rolls 17 and 7 presses the treadle 58, thereby confining the work under the required pressure between the rolls and simultaneously setting up the rotational movement of the latter. The work is fed inwardly with the ironing action previously described until the operator releases the treadle 58, at which time the parts return to their original positions as shown in the drawings, releasing the work and permitting its readjustment between the rolls to cover any areas thereof which were not ironed in the first pass. Since the roll-driving elements are all positioned at one side of the machine, the opposite ends of the rolls are left relatively unobstructed, so that the work, if desired, may be passed inwardly between the rolls from that end. As previously described, the pressure of the rolls is uniform over their entire lengths, so that the ironing action is correspondingly uniform over the entire surface area of the work.

We claim:

1. In an ironing machine, a heated roll, a parallel pressure roll, and means for relatively advancing and retracting said rolls into and out of pressure engagement, said means comprising a rock shaft having arms respectively supporting opposite ends of one of the rolls, said rock shaft and said arms forming the sole supporting means for said one roll, and means for applying turning torque to said shaft, said means comprising a power source and transmission means operatively connecting the said source with the shaft at a point on the latter intermediate and approximately equidistant from said arms.

2. In an ironing machine, a heated roll, a parallel pressure roll, and means for relatively advancing and retracting said rolls into and out of pressure engagement, said means comprising a rock shaft having arms respectively supporting opposite ends of one of the rolls, a lever arm on the shaft intermediate and approximately equidistant from said arms, a relatively fixed abutment, a toggle confined between said lever and the abutment, and means for actuating the toggle.

3. In an ironing machine, a heated roll, a parallel pressure roll, and means for relatively advancing and retracting said rolls into and out of pressure engagement, said means comprising a rock shaft having arms respectively supporting opposite ends of one of the rolls, a lever arm on the shaft intermediate and approximately equidistant from said arms, a relatively fixed abutment, a toggle confined between said lever and the abutment, means for actuating the toggle, and means for adjusting said abutment relative to the lever to thereby regulate the pressure contact between said rolls.

4. In an ironing machine, a heated roll, a parallel pressure roll, and means for relatively advancing and retracting said rolls into and out of pressure engagement, said means comprising a rock shaft having arms respectively supporting opposite ends of one of the rolls, a lever arm on the shaft intermediate and approximately equidistant from said arms, a relatively fixed abutment, a toggle confined between said lever and the abutment, and means for actuating the toggle, said actuating means comprising a piston connected to said toggle and fluid means for actuating said piston.

5. In an ironing machine, a heated roll, a parallel pressure roll, and means for relatively advancing and retracting said rolls into and out of pressure engagement, said means comprising a rock shaft having arms respectively supporting opposite ends of one of the rolls, a lever arm on the shaft, a relatively fixed abutment, a thrust member connecting said abutment with the shaft, a toggle confined between the abutment and said lever, and means for actuating the toggle to rock said shaft.

6. In an ironing machine, a heated roll, a parallel pressure roll, and means for relatively advancing and retracting said rolls into and out of pressure engagement, said means comprising a rock shaft constituting a support for one of said rolls, an arm on said shaft, a relatively fixed abutment, a thrust member extending from said abutment to the shaft, and a toggle confined between the abutment and said arm and constituting a means for rocking the shaft.

7. In an ironing machine, a supporting frame, a rock shaft journaled in said frame, a heated roll and a pressure roll, and means for relatively advancing and retracting said rolls into and out of pressure engagement, said means comprising arms secured to said shaft and constituting a support for one of said rolls, a member constituting a part of said frame and having bosses loosely embracing said shaft, an abutment element carried by said member, a lever arm on said shaft, and a toggle confined between the lever arm and said abutment and constituting a means for rocking the shaft.

8. In an ironing machine, a supporting frame, a rock shaft journaled in said frame, a heated roll and a parallel pressure roll, one of said rolls being mounted on the frame and being relatively fixed, arms on the rock shaft constituting a support for the other of said rolls, and means for rocking the shaft to advance and retract the last-named roll into and out of pressure engagement with said relatively fixed roll, a gear loosely mounted on and concentric with said shaft, a second gear secured to said relatively movable roll and meshing with the gear first named, means for adjusting the relatively fixed roll on the frame, a gear connected to said relatively fixed roll, a gear operatively connecting the last-named gear with the gear first named, means for adjusting the connecting gear about the axis of the first-named gear, and means for driving said first-named gear.

9. In an ironing machine, a heated roll and a parallel pressure roll, one of said rolls being relatively fixed, a rock shaft, arms secured to said shaft and constituting a support for the other of said rolls, toggle mechanism for rocking the shaft to advance and retract the relatively movable roll into and out of pressure engagement with the relatively fixed roll, fluid pressure means for actuating said toggle, a control valve for said fluid means, a motor, means including a normally disengaged clutch operatively connecting the motor with the rolls for rotating the latter, a second rock shaft, a treadle for actuating said shaft, and means for operatively connecting said shaft with the valve and with the clutch for synchronized operation of the latter.

FREDERICK S. STOUT.
WILLIAM G. BOND.
LAWRENCE A. LADNER.